United States Patent
May et al.

(10) Patent No.: US 10,452,076 B2
(45) Date of Patent: Oct. 22, 2019

(54) VEHICLE VISION SYSTEM WITH ADJUSTABLE COMPUTATION AND DATA COMPRESSION

(71) Applicant: MAGNA ELECTRONICS INC., Auburn Hills, MI (US)

(72) Inventors: Benjamin May, Lübs (DE); Joern Ihlenburg, Berlin (DE); Boris Shulkin, West Bloomfield, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 118 days.

(21) Appl. No.: 15/846,260

(22) Filed: Dec. 19, 2017

(65) Prior Publication Data
US 2018/0188740 A1      Jul. 5, 2018

Related U.S. Application Data

(60) Provisional application No. 62/442,097, filed on Jan. 4, 2017.

(51) Int. Cl.
| | | |
|---|---|---|
| *G06K 9/00* | (2006.01) | |
| *G05D 1/02* | (2006.01) | |
| *G01S 17/02* | (2006.01) | |
| *H04N 13/243* | (2018.01) | |
| *G06K 9/03* | (2006.01) | |
| *B60R 1/12* | (2006.01) | |

(52) U.S. Cl.
CPC .......... *G05D 1/0246* (2013.01); *G01S 17/023* (2013.01); *G06K 9/00791* (2013.01); *G06K 9/00993* (2013.01); *G06K 9/036* (2013.01); *H04N 13/243* (2018.05); *B60R 2001/1253* (2013.01)

(58) Field of Classification Search
CPC .......... B60R 2001/1253; G01S 17/023; G05D 1/0246; G06K 9/00791; G06K 9/00993; G06K 9/036; H04N 13/243
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,704,621 B1 | 3/2004 | Stein et al. |

(Continued)

*Primary Examiner* — Xin Jia
(74) *Attorney, Agent, or Firm* — Honigman LLP (57) ABSTRACT

A vision system for a vehicle includes a camera having a camera processor operable to process image data captured by the camera. A central processor is disposed remote from the camera and is operable to process image data captured by the camera. The camera processor processes compressed image data and uncompressed image data and compares ROC curves for a given frame of image data to determine if the compression of that frame of image data has impact on processing of the image data. Responsive to determination that the compression of the frame has impact, the camera processor processes uncompressed data of that frame for a driver assist function and communicates a signal for the driver assist function. Responsive to determination that compression of the frame does not have impact, the vision system communicates compressed data of that frame for processing by the central processor for the driver assist function.

20 Claims, 5 Drawing Sheets

(56) References Cited

U.S. PATENT DOCUMENTS

| | | |
|---|---|---|
| 7,005,974 B2 | 2/2006 | McMahon et al. |
| 7,038,577 B2 | 5/2006 | Pawlicki et al. |
| 7,113,867 B1 | 9/2006 | Stein |
| 7,149,613 B2 | 12/2006 | Stam et al. |
| 7,151,996 B2 | 12/2006 | Stein |
| 7,227,611 B2 | 6/2007 | Hull et al. |
| 7,307,655 B1 | 12/2007 | Okamoto et al. |
| 7,375,803 B1 | 5/2008 | Bamji |
| 7,566,851 B2 | 7/2009 | Stein et al. |
| 7,602,412 B2 | 10/2009 | Cutler |
| 7,605,856 B2 | 10/2009 | Imoto |
| 7,720,580 B2 | 5/2010 | Higgins-Luthman |
| 7,786,898 B2 | 8/2010 | Stein et al. |
| 7,855,755 B2 | 12/2010 | Weller et al. |
| 7,855,778 B2 | 12/2010 | Yung et al. |
| 7,881,496 B2 | 2/2011 | Camilleri et al. |
| 7,914,187 B2 | 3/2011 | Higgins-Luthman et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,446,470 B2 | 5/2013 | Lu et al. |
| 8,452,055 B2 | 5/2013 | Stein et al. |
| 8,553,088 B2 | 10/2013 | Stein et al. |
| 9,900,522 B2 | 2/2018 | Lu |
| 10,187,590 B2 | 1/2019 | Fluegel |
| 2008/0043099 A1 | 2/2008 | Stein et al. |
| 2008/0192129 A1* | 8/2008 | Walker ............... G11B 27/034 348/231.2 |
| 2008/0192132 A1 | 8/2008 | Bechtel et al. |
| 2008/0266396 A1 | 10/2008 | Stein |
| 2009/0022422 A1 | 1/2009 | Sorek et al. |
| 2009/0113509 A1 | 4/2009 | Tseng et al. |
| 2009/0121851 A1* | 5/2009 | Abe ................... G06T 3/4038 340/435 |
| 2009/0153549 A1 | 6/2009 | Lynch et al. |
| 2009/0175492 A1 | 7/2009 | Chen et al. |
| 2009/0190015 A1 | 7/2009 | Bechtel et al. |
| 2009/0290032 A1 | 11/2009 | Zhang et al. |
| 2011/0156887 A1 | 6/2011 | Shen et al. |
| 2012/0069185 A1 | 3/2012 | Stein |
| 2012/0200707 A1 | 8/2012 | Stein et al. |
| 2012/0212480 A1 | 8/2012 | Cho et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0152778 A1 | 6/2014 | Ihlenburg et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2014/0362230 A1* | 12/2014 | Bulan ............... G06K 9/00624 348/169 |
| 2015/0116494 A1* | 4/2015 | Esaka ...................... B60R 1/00 348/148 |
| 2016/0096477 A1 | 4/2016 | Biemer |
| 2017/0031693 A1* | 2/2017 | Honghalli Devaraju .................... G06F 9/4403 |

* cited by examiner

VEHICLE VISION SYSTEM WITH ADJUSTABLE COMPUTATION AND DATA COMPRESSION

CROSS REFERENCE TO RELATED APPLICATION

The present application claims the filing benefits of U.S. provisional application Ser. No. 62/442,097, filed Jan. 4, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known.

Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a processing means that processes frames of captured image data as compressed data and not compressed data to determine if there is an impact by the compression. If there is an impact, the system processes that frame of captured image data in its uncompressed state (via a processor at the camera) for a driver assist feature or vehicle control function or the like. If there is not an impact, the system communicates that frame of captured image data in its compressed state to a central processor where the central processor processes that frame of captured image data for a driver assist feature or vehicle control function or the like.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
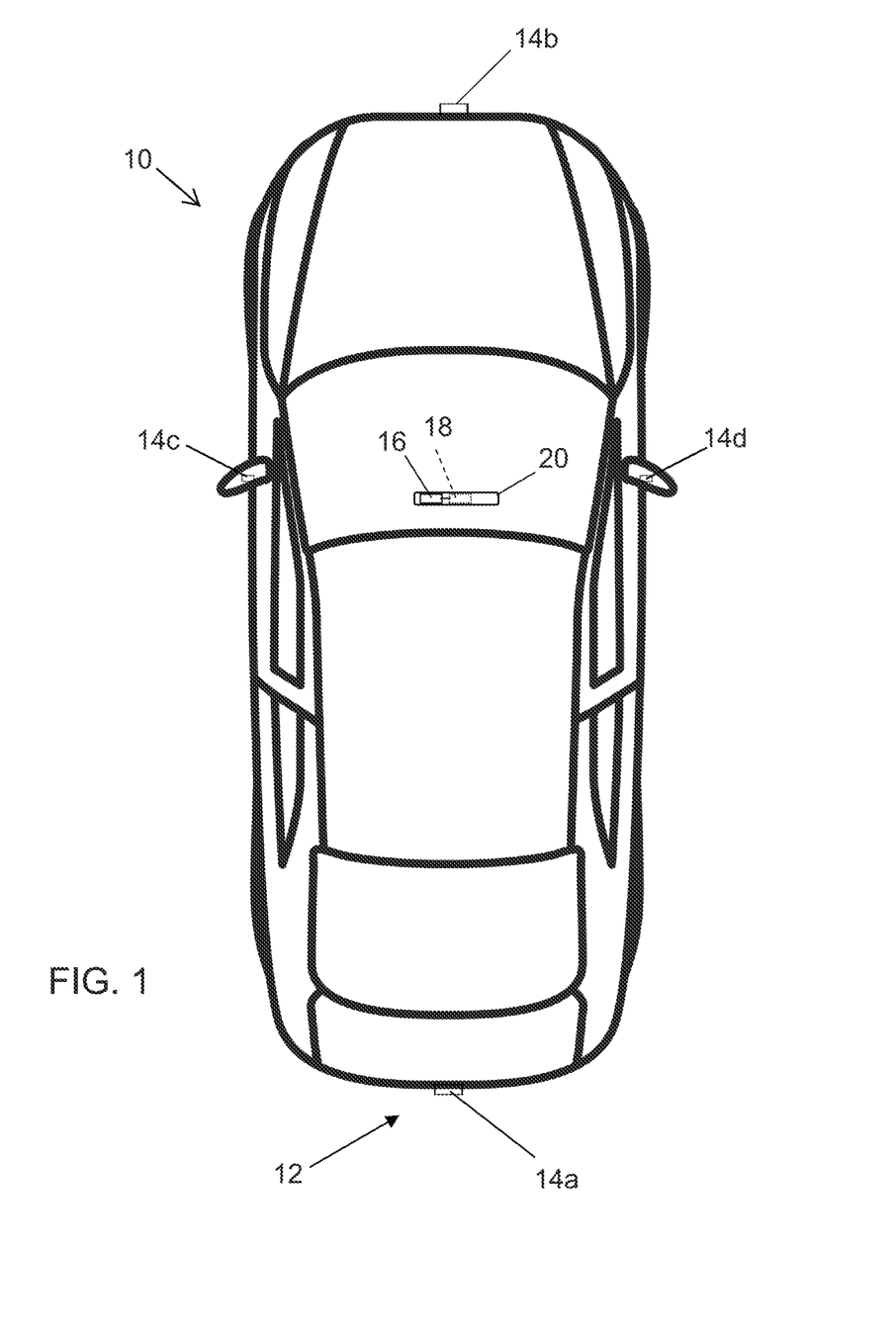
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides enhanced processing of image data captured by the camera or cameras of the vehicle. Next generation sensing will involve intense amount of data and dynamic data and calculation distribution are mandatory to allow best balance between system cost and system performance. Adaptation (dynamic) depends on outside world conditions. The present invention provides for dynamic data compression that is used to reduce bandwidth and that provides justification/proof.

Figure 2:
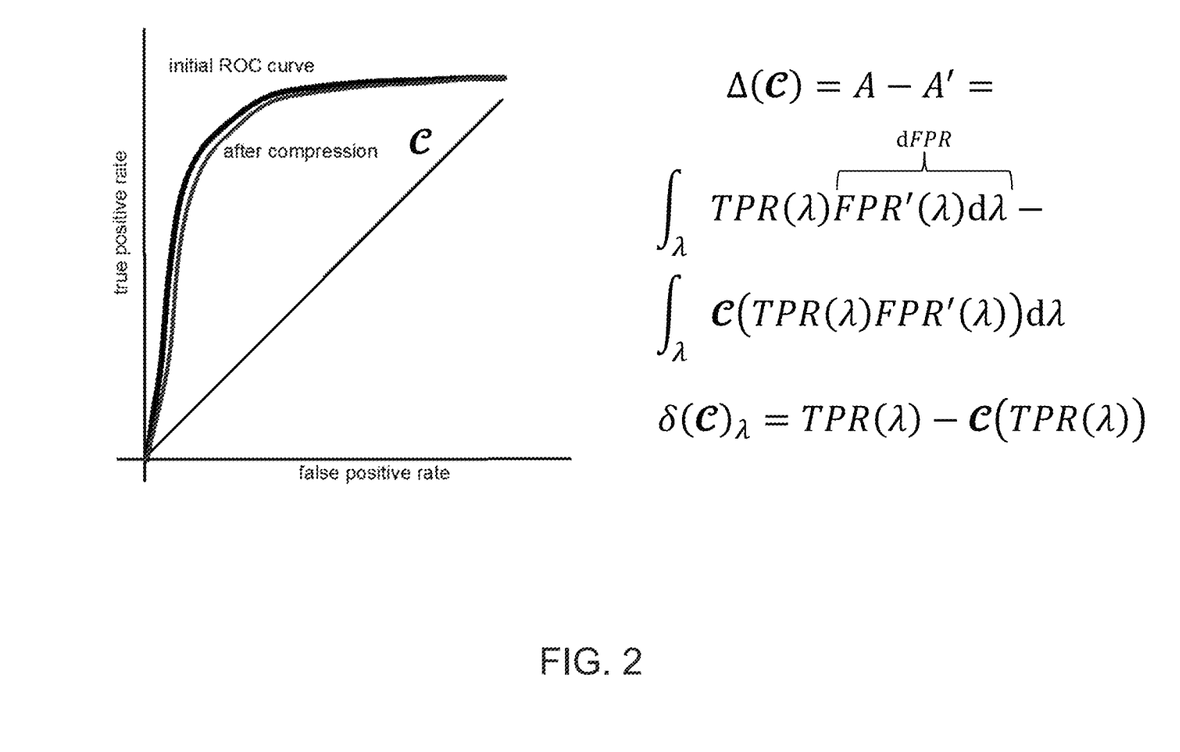
FIG. 2 is a graph of ROC curves generated from processing of image data before and after the image data is compressed.

As shown in FIG. 2, the receiver operating characteristic (ROC) or ROC curve, is a graphical plot that illustrates the performance of a binary classifier system as its discrimination threshold is varied. The curve shows the true positive rate (TPR) versus the false positive rate (FPR) at various threshold settings. Detection for the specific algorithm is key, with the impact expressed in the ROC curve for complete parameter space or for certain parameter configuration. In real life run over scene catalog, worst case $\delta_{catalog}$ & $\Delta_{catalog}$ under $\mathfrak{C}$.

Figure 3:
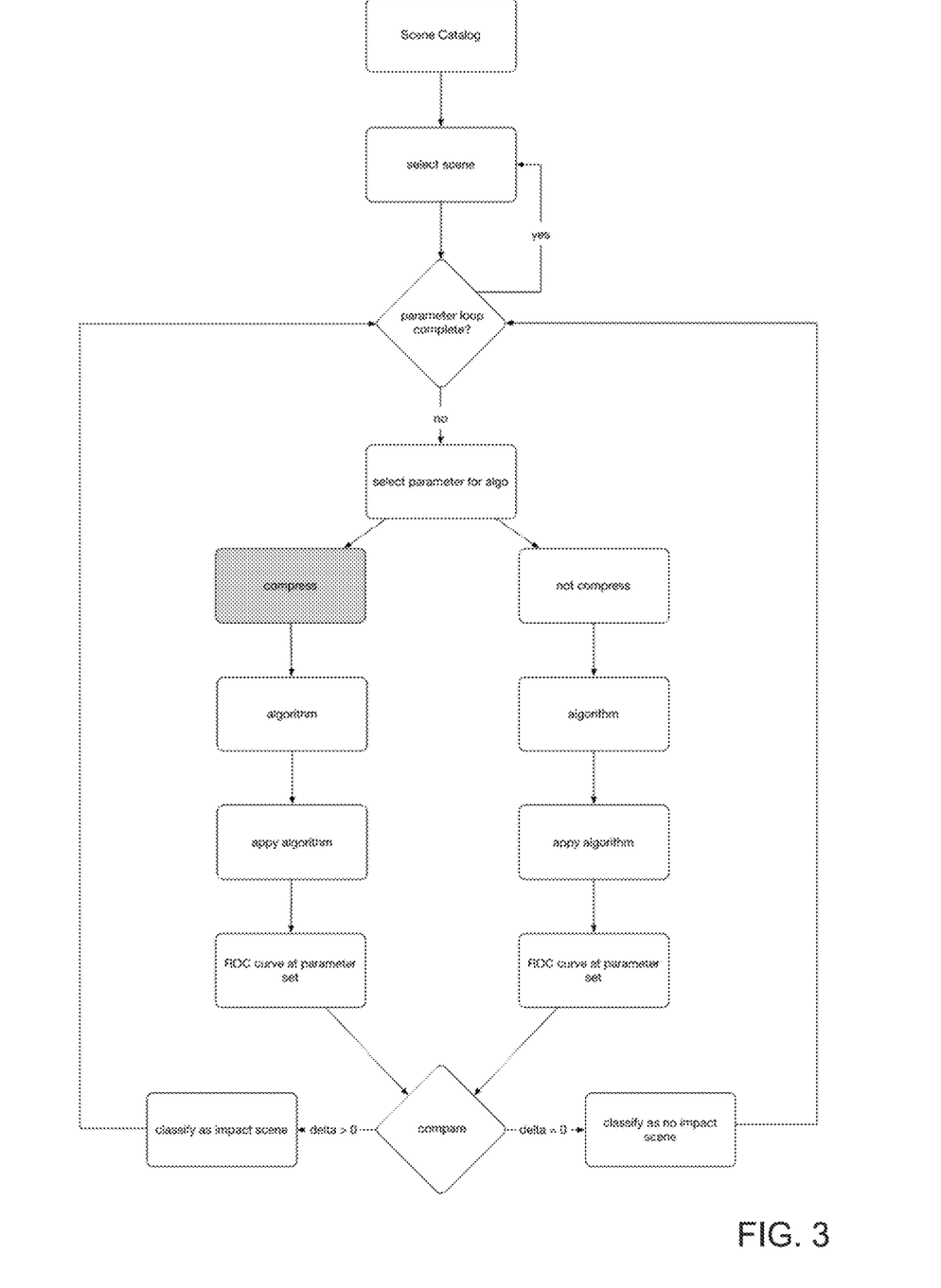
FIG. 3 is a flow chart showing the processing steps of generating ROC curves for processing of compressed image data and not compressed image data to determine the effect of the compression.

The system of the present invention utilizes backend training (see FIG. 3). The system performs backend runs over a given scene and catalogs and calculates an ROC curve as a function of parameter set with and without data compression. As shown in FIG. 3, the system selects a parameter for the algorithm and applies the algorithm to compressed data and to not compressed data and compares the respective ROC curves. This way the scenes get classified as "with" or "without" impact to compression. Analysis is then made (via the local processor at or near the camera) on the "with" scenes (the "impact scenes") to determine KPIs (key performance indicators) to detect scenes at runtime. For example, if the algorithm comprises a headlight assist algorithm, and if single bright pixels get lost under compression, then this can be determined during this classification loop and can be integrated in a second onboard processing step. Then, the system is only processing uncompressed data for the scenes where compression has an impact and can transmit or communicate compressed data to a central processor for scenes where compression does not have an impact, in order to distribute processing in a manner that allows for reduced data transmission.

Figure 4:
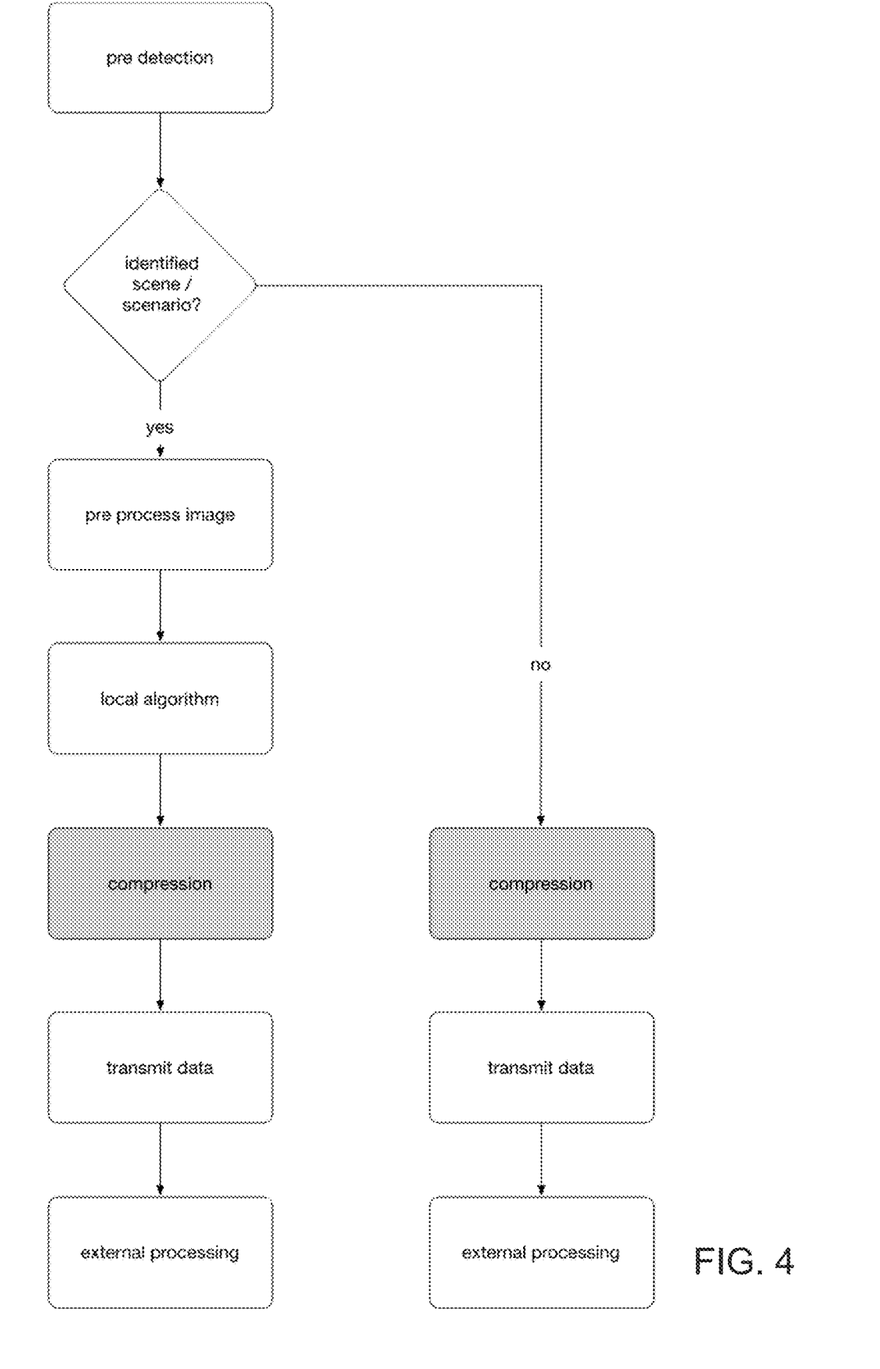
FIG. 4 is a flow chart showing pre-processing of image data via a camera processor or local processor before transmitting compressed data for external processing.

As shown in FIG. 4, onboard processing pre analyzes the live image to look for an impacted scene. If an impacted scene is found, then onboard (at the camera or sensor) processing happens, otherwise data is sent or communicated or transmitted (such as via a vehicle bus network or the like) to a central processing unit. Separation of the algorithm tasks then is also possible in "impacted" and "not impacted" portions. The local algorithms are thus only applied to "impact scenes" or frames of image data, while external processing may be done to "non-impact scenes" or frames of image data and optionally also to "impact scenes" or frames of image data (after processing by the local algorithm). As several algorithms run in parallel, local and central processing can be balanced and overall system costs (BOM cost) can be reduced.

Figure 5:
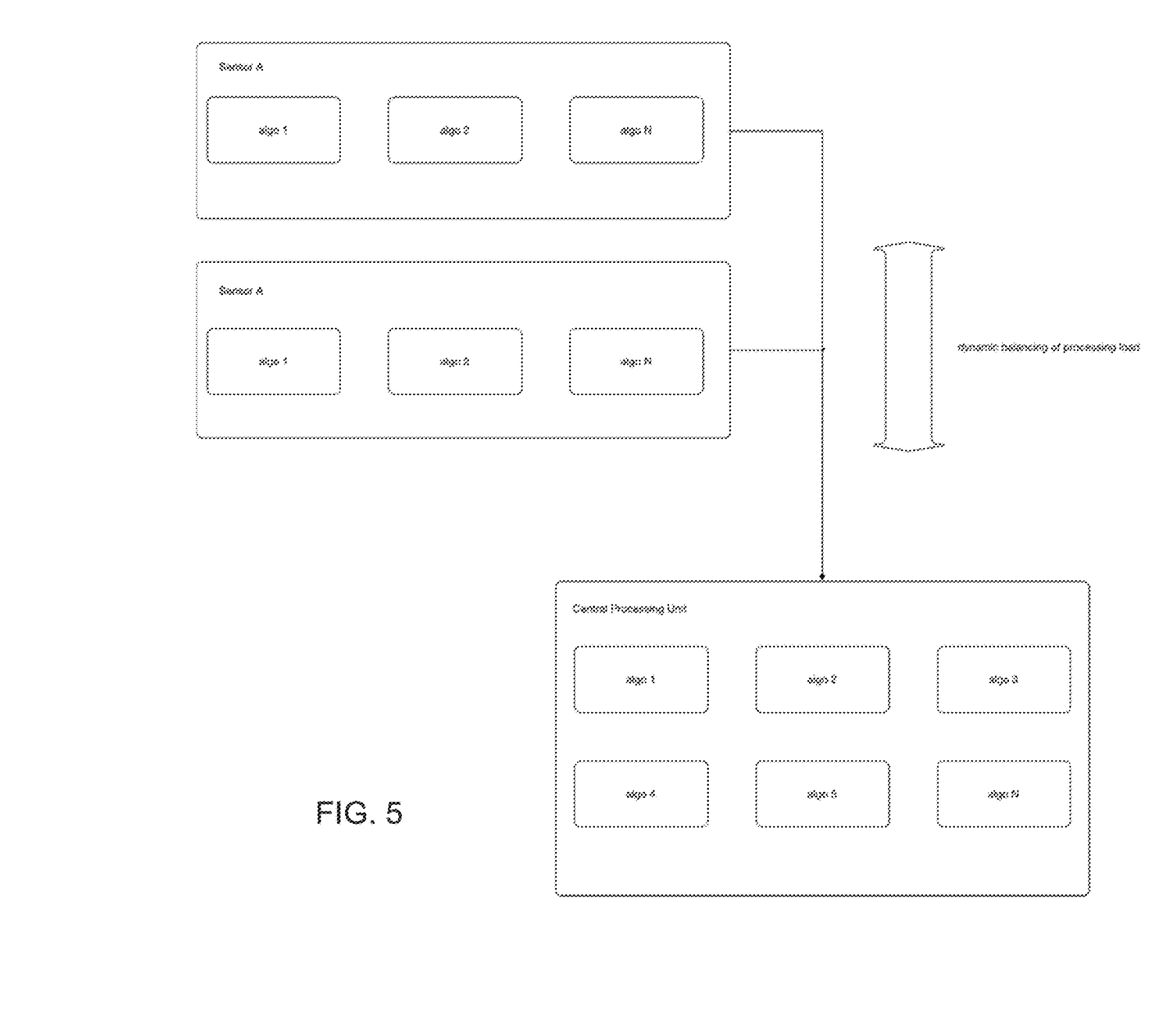
FIG. 5 is a block diagram showing use of multiple algorithms for two sensors and a central processing unit, with dynamic balancing of the processing load.

As shown in FIG. 5, dynamic scheduling of algorithmic processing is provided for a two sensor system with local algorithms and with one central processing unit that has associated algorithms. Arbitrary scaling is possible and may be intended.

Thus, the system may comprise multiple sensors or cameras, such as for driver assist functions or autonomous or semi-autonomous vehicle control, with the cameras or sensors including a respective local processor for processing captured data captured by that camera or sensor, and with the system further including a central processing unit for processing captured data that is transmitted to or communicated to and received by the central processing unit. The system balances the data processing (between the local processor(s) and the central processor) to limit or avoid costly interfaces (by avoiding transmission of non-compressed data) and to reduce computational power needs. The system determines when the captured data is affected by compression and, when a frame of captured image data is affected by compression, the local processor processes the uncompressed data, and when the frame of captured image data is not affected by compression, the sensor transmits or communicates the compressed data to the central processor for processing. Thus, the system does not have to communicate uncompressed data to the central processor and instead, depending on the impact of compression of the image data, processes uncompressed data at the camera or sensor (and communicates a signal indicative of the processing to the central processor for control of the feature or driver assistance system) or communicates compressed data to the central processor whereby the compressed data is processed at the central processor (to generate a signal or control of the feature or driver assistance system).

Therefore, the present invention provides a vision system of a vehicle that includes one or more cameras configured to be disposed at a vehicle so as to have respective fields of view exterior of the vehicle. The camera or sensor includes a local image processor operable to process frames of image data captured by that camera or sensor, and the system includes a central image processor that is operable to process frames of image data captured by the camera or cameras. The image processors process captured image data via one or more algorithms.

The camera control and processor processes a frame of captured image data as both compressed captured image data and not compressed captured image data and generates respective ROC curves of the compressed image data and uncompressed image data for that frame of captured image data. The system compares ROC curves of the compressed image data and uncompressed image data for a given frame of image data to determine if the compression of that frame of captured image data has an impact on processing of the captured image data. Responsive to determination that the frame of captured image comprises an impact frame (i.e., compression of the image data has impact on the processing of the captured image data, which may be determined by determining a difference between the ROC curves above a threshold level), the vision system processes uncompressed image data of that frame of captured image data (in its uncompressed state) via the processor at the camera or sensor for a driver assist function or vehicle control function or the like. Responsive to determination that the frame of captured image does not comprise an impact frame (i.e., compression of the image data does not have a significant impact on the processing of the captured image data, which may be determined by determining that the ROC curves are similar or have differences below the threshold level), the vision system does not process that frame of captured image data with the camera processor and instead communicates the compressed image data for that frame to the central processor for processing of the compressed image data for a driver assist function or vehicle control function or the like.

The system may process impact frames of non-compressed image data via one or more algorithms local to the sensor or camera and may process non-impact frames of compressed image data via one or more algorithms at a central processing unit separate or remote from the sensor or camera. The system may alternate where the image data is processed responsive to relative changes in the ROC curves, and thus may provide dynamic balancing of the processing loads of the sensors and the central processing unit.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:

a camera configured to be disposed at a vehicle so as to have, when disposed at the vehicle, a field of view exterior of the vehicle, wherein said camera comprises a camera processor operable to process image data captured by said camera;

a central processor of the vehicle that, with said camera disposed at the vehicle, is disposed in the vehicle at a location separate from and remote from said camera and that is operable to process frames of image data captured by said camera;

wherein image data captured by said camera and processed by said camera processor comprises compressed image data and uncompressed image data;

wherein said camera processor processes compressed image data and uncompressed image data and generates respective receiver operating characteristic (ROC) curves;

wherein said camera processor compares the ROC curves of the compressed image data and the uncompressed image data for a given frame of captured image data to determine if compression of image data of that frame of captured image data has impact on processing of captured image data, and wherein the impact is determined when a difference between the compared ROC curves of the compressed image data and uncompressed image data for the given frame of image data is greater than a threshold level;

wherein, responsive to determination that compression of image data of the frame of captured image data has impact on the processing of image data, said camera processor processes the uncompressed image data of that frame of image data for a driver assist function and communicates a signal to said central processor for the driver assist function; and wherein, responsive to determination that compression of image data of the frame of captured image data does not have impact on the processing of image data, said vision system communicates compressed image data of that frame of image data to said central processor for processing by said central processor for the driver assist function.

2. The vision system of claim 1, wherein said vision system comprises multiple cameras.

3. The vision system of claim 2, wherein each of said cameras of said multiple cameras comprises a respective camera processor, and wherein each of said camera processors compares ROC curves of the compressed image data and uncompressed image data for a given frame of image data captured by that camera to determine if the compression of image data of that frame of image data has impact on processing of captured image data.

4. The vision system of claim 3, wherein, responsive to determination that compression of image data of the frame of image data captured by that respective camera does not have impact on processing of captured image data, said vision system communicates compressed image data of that frame of image data captured by that camera of said multiple cameras to said central processor for processing by said central processor for the driver assist function.

5. The vision system of claim 1, wherein said processors process captured image data via one or more algorithms.

6. The vision system of claim 5, wherein multiple algorithms are applied to image data captured by said camera by said camera processor and said central processor.

7. The vision system of claim 6, wherein said vision system comprises dynamic balancing of processing load when applying the algorithms.

8. The vision system of claim 1, wherein said vision system comprises dynamic balancing of the processing loads of said camera processor and said central processor.

9. The vision system of claim 1, wherein, responsive to determination that compression of image data of the frame of captured image data has impact on processing of captured image data, said vision system communicates compressed image data of that frame of image data to said central processor for further processing by said central processor for the driver assist function.

10. The vision system of claim 9, wherein the further processing by said central processor is done after processing of uncompressed image data of that frame of image data by said camera processor.

11. A vision system for a vehicle, said vision system comprising:

a camera configured to be disposed at a vehicle so as to have, when disposed at the vehicle, a field of view exterior of the vehicle, wherein said camera comprises a camera processor operable to process image data captured by said camera;

a central processor of the vehicle that, with said camera disposed at the vehicle, is disposed in the vehicle at a location separate from and remote from said camera and that is operable to process frames of image data captured by said camera;

wherein said vision system comprises dynamic balancing of processing load of said camera processor and said central processor;

wherein each of said camera processor and said central processor processes captured image data via one or more algorithms;

wherein image data captured by said camera and processed by said camera processor comprises compressed image data and uncompressed image data;

wherein said camera processor processes compressed image data and uncompressed image data and generates respective receiver operating characteristic (ROC) curves;

wherein said camera processor compares the ROC curves of the compressed image data and the uncompressed image data for a given frame of captured image data to determine if compression of image data of that frame of captured image data has impact on processing of captured image data, and wherein the impact is determined when a difference between the compared ROC curves of the compressed image data and uncompressed image data for the given frame of image data is greater than a threshold level;

wherein, responsive to determination that compression of image data of the frame of captured image data has impact on the processing of image data, said camera processor processes the uncompressed image data of that frame of image data for a driver assist function and communicates a signal to said central processor for the driver assist function; and wherein, responsive to determination that compression of image data of the frame of captured image data does not have impact on the processing of image data, said vision system communicates compressed image data of that frame of image data to said central processor for processing by said central processor for the driver assist function.

12. The vision system of claim 11, wherein said vision system comprises multiple cameras.

13. The vision system of claim 12, wherein each of said cameras of said multiple cameras comprises a respective camera processor, and wherein each of said camera processors compares ROC curves of the compressed image data and uncompressed image data for a given frame of image data captured by that camera to determine if the compression of image data of that frame of image data has impact on processing of captured image data.

14. The vision system of claim 13, wherein, responsive to determination that compression of image data of the frame of image data captured by that respective camera does not have impact on processing of captured image data, said vision system communicates compressed image data of that frame of image data captured by that camera of said multiple cameras to said central processor for processing by said central processor for the driver assist function.

15. A vision system for a vehicle, said vision system comprising:
   a camera configured to be disposed at a vehicle so as to have, when disposed at the vehicle, a field of view exterior of the vehicle, wherein said camera comprises a camera processor operable to process image data captured by said camera;
   a central processor of the vehicle that, with said camera disposed at the vehicle, is disposed in the vehicle at a location separate from and remote from said camera and that is operable to process frames of image data captured by said camera;
   wherein said vision system comprises dynamic balancing of the processing loads of said camera processor and said central processor;
   wherein image data captured by said camera and processed by said camera processor comprises compressed image data and uncompressed image data;
   wherein said camera processor processes compressed image data and uncompressed image data and generates respective receiver operating characteristic (ROC) curves;
   wherein said camera processor compares the ROC curves of the compressed image data and the uncompressed image data for a given frame of captured image data to determine if compression of image data of that frame of captured image data has impact on processing of captured image data, and wherein the impact is determined when a difference between the compared ROC curves of the compressed image data and uncompressed image data for the given frame of image data is greater than a threshold level;
   wherein, responsive to determination that compression of image data of the frame of captured image data has impact on the processing of image data, said camera processor (i) processes the uncompressed image data of that frame of image data for a driver assist function, (ii) communicates a signal to said central processor for the driver assist function, and (iii) communicates the compressed image data of that frame of image data to said central processor for further processing by said central processor for the driver assist function; and
   wherein, responsive to determination that compression of image data of the frame of captured image data does not have impact on the processing of image data, said vision system communicates compressed image data of that frame of image data to said central processor for processing by said central processor for the driver assist function.

16. The vision system of claim 15, wherein the further processing by said central processor is done after processing of uncompressed image data of that frame of image data by said camera processor.

17. The vision system of claim 16, wherein said processors process captured image data via one or more algorithms.

18. The vision system of claim 15, wherein said vision system comprises multiple cameras.

19. The vision system of claim 18, wherein each of said cameras of said multiple cameras comprises a respective camera processor, and wherein each of said camera processors compares ROC curves of the compressed image data and uncompressed image data for a given frame of image data captured by that camera to determine if the compression of image data of that frame of image data has impact on processing of captured image data.

20. The vision system of claim 19, wherein, responsive to determination that compression of image data of the frame of image data captured by that respective camera does not have impact on processing of captured image data, said vision system communicates compressed image data of that frame of image data captured by that camera of said multiple cameras to said central processor for processing by said central processor for the driver assist function.

* * * * *